Patented Oct. 13, 1931

1,826,722

UNITED STATES PATENT OFFICE

JULIEN BELLAY, OF BRUSSELS, BELGIUM

PROCESS OF PREPARING SODA-LIME TO BE USED IN THE MANUFACTURE OF PURE HYDROGEN

No Drawing. Original application filed January 13, 1928, Serial No. 246,558, and in Belgium January 26, 1927. Divided and this application filed April 30, 1929. Serial No. 359,418.

My present invention relates to the process of continuously producing pure hydrogen, whereby a special preparation of soda-lime is used to entirely separate small quantities of carbon monoxide and other impurities contained in the hydrogen as produced according to the improved process described and claimed in my co-pending application filed January 13, 1928, Serial # 246,558, of which the present application is a division, and the invention has for its object a process of preparing such special preparation of soda-lime.

By definition soda-lime is a mixture of lime and sodium hydroxide obtained by pouring a solution of sodium hydroxide upon calcium oxide and calcining the mixture in a crucible. The slaking of calcium oxide made according to my process yields a compound which does not correspond to the composition by the theoretical reaction between one molecule of sodium hydroxide and one molecule of calcium oxide according to the known chemical formula, but contains a supplemental amount of sodium hydroxide and water in order to give the mass the required binding and permit the same to remain shaped after calcination at low temperature.

It is noteworthy that according to my process, I obtain a soda-lime brick, which contains a much higher proportion of sodium hydroxide when compared to any other known process and which is, therefore, adapted to absorb a higher percentage of carbon monoxide before having to be regenerated. The process is carried out as follows: Calcium oxide is slaked by means of or in a solution of sodium hydroxide according to the usual method of manufacturing soda-lime, and this well known operation need not be further explained to those skilled in the art. Such slaking yields a pasty, almost solid mass, which I calcine in a crucible to dryness and which may then be called quick-soda-lime.

Such quick soda-lime will then be slaked by a solution of 5% of sodium hydroxide at 95° C in a proportion of 800 grams per kilogram of soda-lime, whereby flower of soda-lime will be obtained. Such flower of soda-lime will be brought into a conical separator, closed and provided with a ventilator, so as to remove any non-slaked particles which could obstruct the passage of gas in the retorts during the operation. Then it will be discharged into molds provided with partitions forming rectangular volumes of about 50 x 100 x 30 millimeters. Said partitions rest on a movable bottom forming an ejector. Said molds are arranged on an endless belt and submit the soda-lime powder to the sprinkling of a solution of soda-lime milk or sodium chloride solution at 50° C. Such sprinkling will be effected progressively so as not to form a liquid paste in the molds and cause the solution to slowly impregnate into the soda-lime in a hot and powdered state, a second sprinkling being effected only after the first one has filtered through the powder of soda-lime. The number of sprinklings is calculated in such a way that at the end of the endless belt the molds will contain a sort of bricks of hydrated soda-lime which may be easily removed and placed upon wooden hurdles in order to obtain a definite shape.

A substantially similar result may be obtained by a mixing operation, but the method above described has the advantage over a mixing operation in that the method does not compress or triturate the soda-lime and further results in a fine brick containing 1250 grams of the hot solution for two kilograms of soda-lime powder. Said solution will slowly impregnate the powder and solidify the same, at the same time giving same such high porosity and moistness that it will be particularly convenient for absorbing quickly the CO contained in the water gas. The bricks of about 50 x 100 x 30 millimeters placed upon hurdles will be quickly dried by the action of the heat contained in the paste and having the great advantage with relation to any smaller product that they have but a few faces to be dried and therefore keep the moistness as long as possible.

This operation serves to exactly proportion the soda-lime powder with a hot solution, thus producing bricks which may be used a few hours after their manufacture without previous drying. The degree of moistness will considerably influence the result of the purification of the hydrogen, saving time in heating, securing a longer period of purification, a better preservation of steam and particularly less sintering in the regeneration of soda-lime.

The hydrated soda-lime bricks after a few hours have a solid, porous shape adapted to be handled. Said bricks will be manufactured in sizes suitable for the retorts intended to receive the same. The larger the retort, the longer the bricks but of the same thickness.

For the purpose of purifying the retorts prior to the use thereof, a solution of caustic soda or potash will be slightly vaporized on the brick to remove any $CO_2$ and $O$ contained in the retort and carbonate the faces of the latter.

Having now fully described my said invention, what I claim and desire to secure by Letters Patent, is:

1. A process of preparing soda-lime in the shape of porous bricks containing a high proportion of sodium hydroxide and adapted to purify hydrogen from carbon monoxide, which consists in preparing ordinary soda-lime by slaking calcium oxide by means of a solution of sodium hydroxide, calcining said soda-lime, effecting over said calcined soda-lime a series of sprinklings by means of a solution of sodium hydroxide adapted to coagulate said calcined soda-lime in the shape of solid bricks in suitable molds, removing said bricks from said molds, and partly drying said bricks before use.

2. A process of preparing soda-lime in the shape of porous bricks containing a high proportion of sodium hydroxide and of purifying hydrogen from carbon monoxide by means of said bricks, which consists in preparing ordinary soda-lime by slaking calcium oxide by a suitable solution of sodium hydroxide, calcining said soda-lime by means of a hot diluted solution of sodium hydroxide for obtaining a powder of soda-lime, distributing said powder in a series of molds adapted to form prismatic bricks of convenient shape, effecting over said powder of soda-lime in molds a series of sprinklings by means of a warm solution of sodium hydroxide until said powder of soda-lime is coagulated in the molds in shape of solid bricks, removing said bricks from said molds, partly drying said bricks, placing said bricks in retorts adapted to be heated, and conducting the hydrogen to be purified through said retorts.

JULIEN BELLAY.